United States Patent
Croisdale et al.

(10) Patent No.: US 7,124,459 B1
(45) Date of Patent: Oct. 24, 2006

(54) METHOD AND APPARATUS FOR HANGING LIGHTS AND OTHER FIXTURES

(76) Inventors: Christopher A. Croisdale, 27214 Trenton Pl., Valencia, CA (US) 91354; Jeno Horvath, 26846 Oak Ave., Unit J., Canyon Country, CA (US) 91351; Robert W. McKee, 26831 Ruether Ave., Santa Clarita, CA (US) 91351

( * ) Notice: Subject to any disclaimer, the term of this patent is extended or adjusted under 35 U.S.C. 154(b) by 10 days.

(21) Appl. No.: 11/121,855

(22) Filed: May 3, 2005

(51) Int. Cl.
  *B25F 3/00* (2006.01)
(52) U.S. Cl. .......................... 7/158
(58) Field of Classification Search ............ 7/158; 81/461, 488
  See application file for complete search history.

(56) References Cited

U.S. PATENT DOCUMENTS

| | | | |
|---|---|---|---|
| 2,930,199 A | 3/1960 | Jarund | |
| 3,130,503 A | 4/1964 | Rosan | |
| 4,149,350 A | 4/1979 | Fischer et al. | |
| 4,193,715 A | 3/1980 | Vass | |
| 4,263,832 A | 4/1981 | Lang et al. | |
| 4,404,875 A | 9/1983 | Sadanandan et al. | |
| 4,419,805 A | 12/1983 | Calandra, Jr. | |
| 4,507,817 A * | 4/1985 | Staffeld | 7/158 |
| 4,514,125 A | 4/1985 | Stol | |
| 4,518,292 A | 5/1985 | Calandra, Jr. | |
| 4,652,193 A | 3/1987 | Hibbs | |
| 4,729,705 A | 3/1988 | Higgins | |
| 4,738,255 A * | 4/1988 | Goble et al. | 606/86 |
| 4,867,249 A * | 9/1989 | Watkins et al. | 173/29 |
| 5,255,485 A * | 10/1993 | Lemke et al. | 52/410 |
| 5,409,333 A * | 4/1995 | Hu | 408/239 A |
| 5,568,711 A | 10/1996 | Popp et al. | |
| 5,653,563 A | 8/1997 | Ernst et al. | |
| 5,711,043 A * | 1/1998 | Crawford et al. | 7/165 |
| 5,807,051 A | 9/1998 | Heminger | |
| 5,979,913 A * | 11/1999 | Kosik et al. | 279/145 |
| 6,033,162 A * | 3/2000 | Uebele et al. | 408/239 R |
| 2001/0029634 A1* | 10/2001 | Lamarre | 7/158 |

* cited by examiner

*Primary Examiner*—David B. Thomas
(74) *Attorney, Agent, or Firm*—Edward A. Sokolski

(57) ABSTRACT

A drill bit is connected to a drill in a simple and rapid manner and used to drill a hole in a backing which may be of wood, plastic or other material in which threads can readily be formed. A threaded insert which has a slightly greater diameter than the hole is then connected to the drill bit in the same manner as the drill and driven by the drill into the hole. The insert forms matching threads in the walls of the hole so that the insert is threadably attached to the backing. A retainer from which a hook is suspended is formed in the insert to permit the hanging of fixtures on the insert.

9 Claims, 3 Drawing Sheets

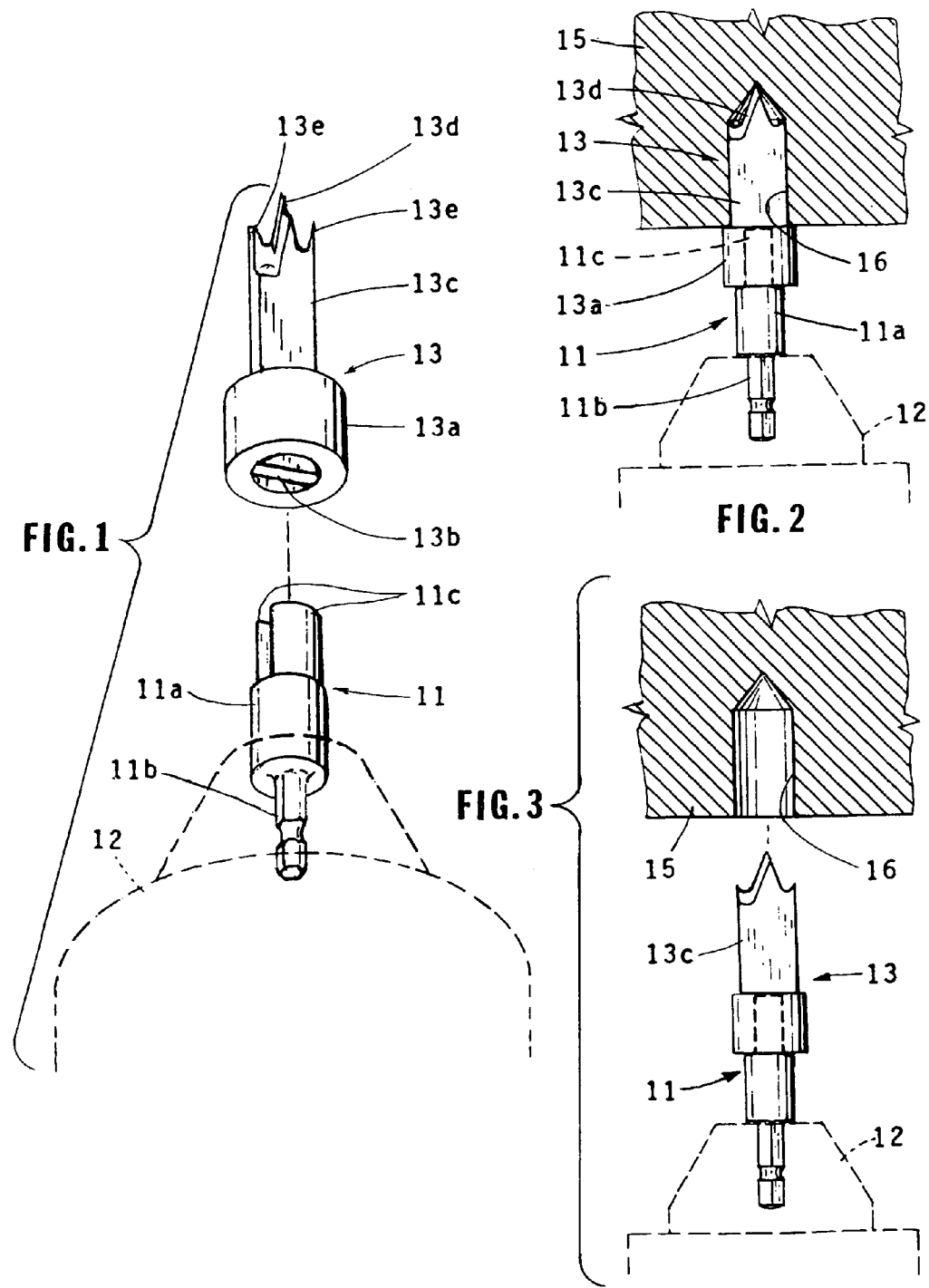

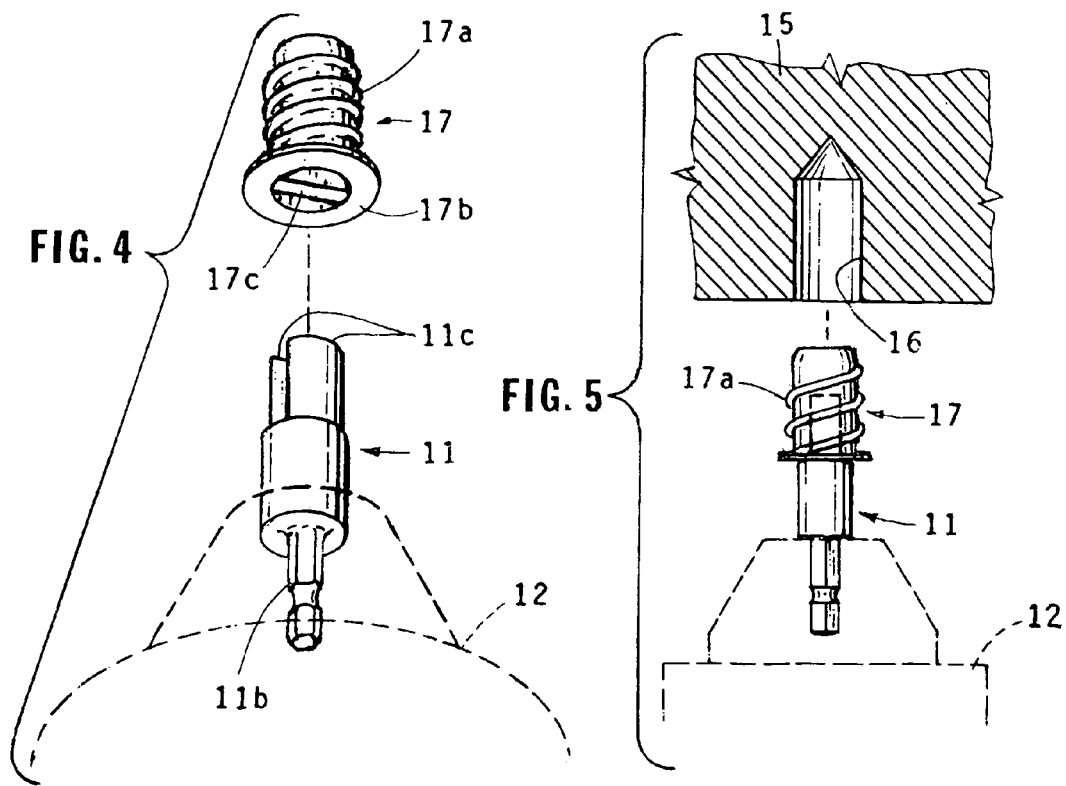
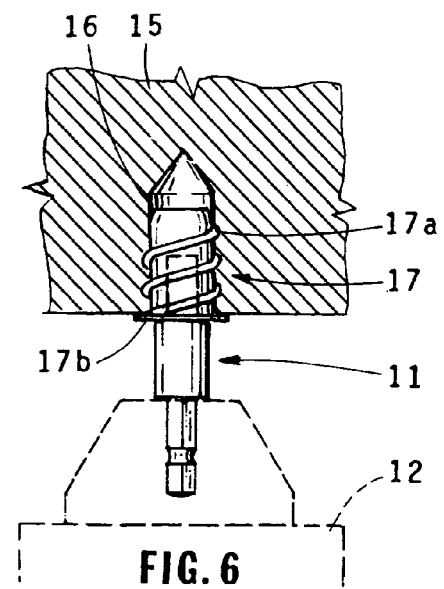

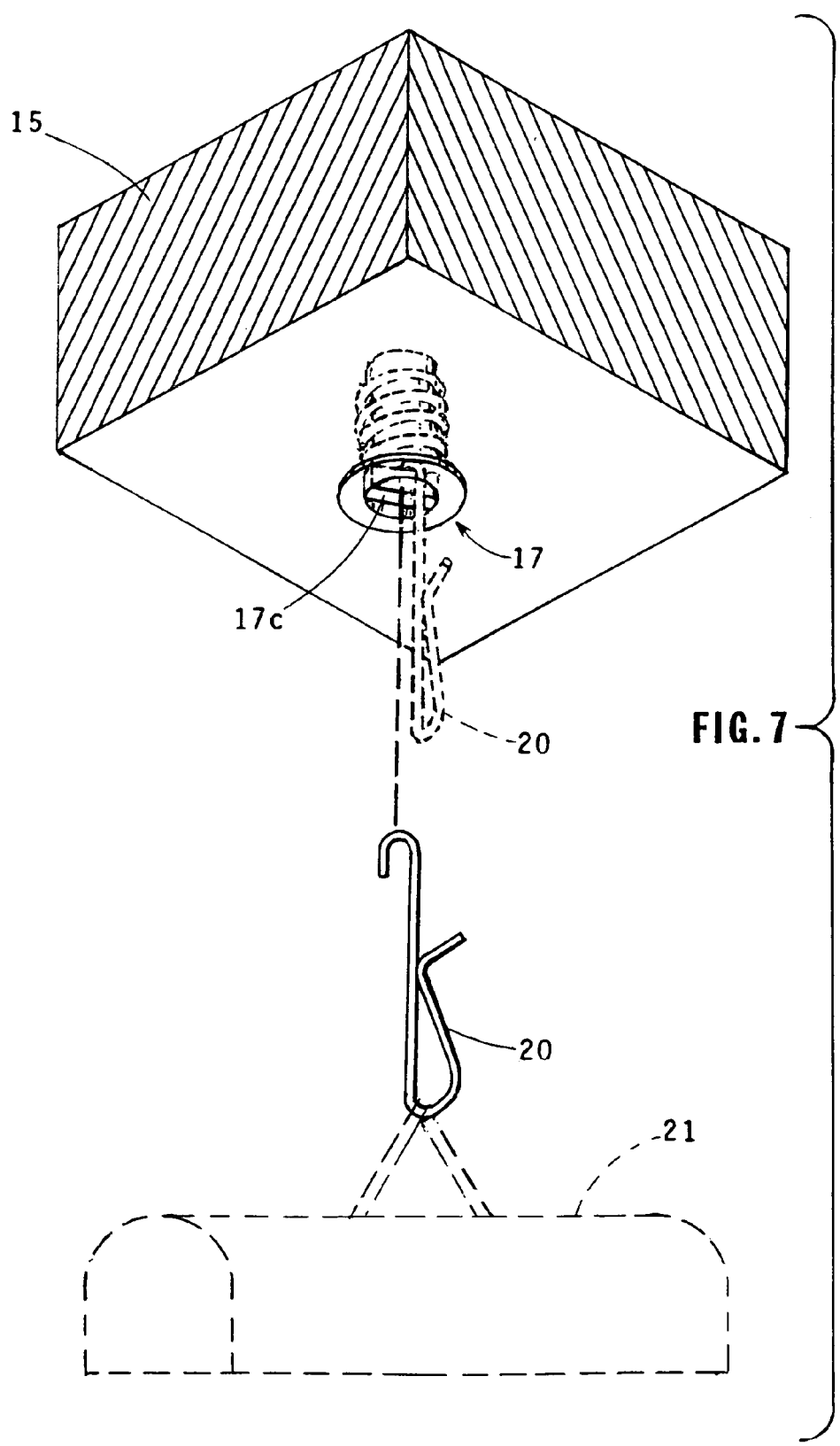

METHOD AND APPARATUS FOR HANGING LIGHTS AND OTHER FIXTURES

BACKGROUND OF THE INVENTION

1. Field of the Invention

This invention relates to an insert hanger device for mounting fixtures or holiday lights on a wooden support or the like and a method for its installation in which the same drill chuck can be utilized to both drill a hole and drive a threaded insert into the hole to form a mating thread on the sides of the hole.

2. Description of the Related Art

Devices are described in the prior for forming a hole in a support member, often concrete and then driving a stud or an insert into the concrete. In most of these devices, there is sealing resin placed in a container in the hole, and this container is pierced by the pointed end of the insert to form a seal for holding the insert in place. U.S. Pat. No. 4,652,193 issued on Mar. 24, 1987 to Hibbs and U.S. Pat. No. 4,404,875 issued Sep. 20, 1983 to Sadanandan describe such devices in which a hole is first formed in concrete with a drill and then an insert is attached to a drill bit and driven into the hole by a drill. In both of these devices, there is a container with resin or the like placed in the hole which is pierced by the insert so that the resin flows around the insert to seal it in place.

In both of these devices the insert is sealed in place and cannot readily be removed should this be necessary. These prior art devices are constructed to attach implements to the concrete surface with nuts and not to hang fixtures or the like therefrom. Further, these devices are not adapted to utilize the same drill chuck for both drilling the hole and driving the insert or stud into place and for rapidly and easily alternatively connecting the drill chuck to the drill bit or the insert and removing the chuck therefrom.

SUMMARY OF THE INVENTION

The device of the invention is an improvement over the prior art in that it has a threaded cylindrical insert which is driven by a drill into a hole which has previously been formed by a drill bit attached the same drill chuck as used in drilling the hole. The threaded insert forms a mating thread in the backing which may be of wood so that the insert is threadably attached to the wall of the hole and can readily be removed for repair or replacement. The drill chuck has a pair of approximately parallel driver arms for alternative connection to similar bars formed in the center of the drill bit and insert. When installed, the driver arms are. vertically free from the bars but are not rotational relative thereto so that the drill chuck alternatively rotatably drive the drill bit or the insert but is removably attached thereto.

The removal and attachment of the drill bit and insert to the drill chuck is thus, simply and rapidly achieved. A hook is removably connected to the bar formed in the center of the insert, the fixture being supported on the hook.

DESCRIPTION OF THE DRAWNGS

FIG. 1 is an exploded perspective view of the drill chuck and drill bit of a preferred embodiment of the invention;

FIG. 2 is a side elevational view showing the drill bit and drill chuck of the preferred embodiment immediately after the hole has been drilled;

FIG. 3 is a side elevational view showing the hole drilled in the backing by the drill bit;

FIG. 4 is an exploded perspective view illustrating the drill chuck and insert of the preferred embodiment; FIG. 5 is a side elevational view showing the insert prior to its installation in the hole; and FIG. 5 is a side elevational view showing the insert prior to its installation in the hole;

FIG. 6 is a side elevational view showing the insert after it has been driven into the hole; and FIG. 7 is a bottom perspective view illustrating the installation of the hook for supporting the fixtures from the insert.

DETAILED DESCRIPTION OF THE INVENTION

Referring to FIG. 1, an exploded view of the drill bit and chuck of a preferred embodiment of the invention is illustrated. The drill chuck 11 is removably attached to drill 12 and has a cylindrical central portion 11a, an end portion 11b which is attached to the drill, and a pair of driver arms 11c which are approximately parallel to each other and extend from the end of the chuck opposite to end portion 11b.

Drill bit 13 has a hollow cylindrical portion 13a which has a centrally located arm 13b which extends into the center of the cylinder. Driver arms 11c are slidably inserted into the drill over arm 13b and are slidably removable therefore but not rotatable relative thereto, thereby providing a drivable connection between the drill bit and the drill.

Extending from cylinder 13a is a drill bit 13c which has first and second pairs of opposing blades 13d and 13e. The blades 13d are of the same size and shape as are blades 13e. Blades 13d are longer than blades 13c.

Referring to FIG. 2, the drill bit 13 is shown after it has driven a hole in backing 15 which may be of wood. The top surface of cylindrical portion 13a of the drill bit acts as a stop to limit the depth of the hole. 16. Referring to FIG. 3, the hole 16 which is drilled into the backing is illustrated.

Referring to FIG. 4, an exploded view of the drill chuck 11 and the insert 17 is shown. Insert 17 is in the form of a hollow cylinder and has threads 17a formed on its outer surface. A circular stop portion 17b is formed on the top of the insert to limit its travel into the hole 16. The insert further has a centrally located arm 17c which is similar to the arm 13b formed in the drill bit. The opposing driver arms 11c of the drill chuck fit into the insert over arm 17c as shown in FIG. 5 and thus enable the chuck to be driven by the drill 12. The diameter of the insert 17 is slightly larger than that of the hole so that when the insert is driven into the whole 16, a thread is formed in the sides of the hole formed in backing 15. In this manner, the insert is threadably attached to the sides of the hole for ready removal and replacement or repair as may be required. The similar rapid attachment and removal of both the drill bit and the insert to the drill chuck facilitates the installation of inserts, particularly in situations where many inserts are being successively installed.

FIG. 5 is an exploded view showing the insert before it is installed while FIG. 6 shows the insert installed but prior to the removal of the drill chuck.

Fixtures 21 are attached to the insert 17 installed in backing 15 by means of hook 20 which is suspended from arm 17c and from which the fixture 21 which may be a light fixture is suspended, as shown in FIG. 7.

While the invention has been described and illustrated in detail, it is to be understood that this is by way of illustration and example only, the spirit and scope of the invention being limited by the terms of the following claims.

We claim:

1. A device for removably supporting a fixture on a backing comprising:
    a drill bit for use in driving a hole in said backing;
    an insert member having an outer diameter slightly greater than the diameter of said hole, said insert member having a thread formed on the outer wall thereof;
    a drill chuck for alternatively attaching said drill bit or said insert to a drill;
    said drill being employed to drive said insert member into said hole, the thread formed on the insert forming a matching thread on the wall of said hole, the insert member threadably engaging the wall of the hole and thereby being removably attached thereto; and
    means for removably supporting said fixture on said insert.

2. The device of claim 1 wherein the means for attaching the insert member and said drill bit to said drill chuck comprises a pair of approximately parallel drive arm members extending from said drill chuck, an arm formed in the central portion of said drill bit and an arm similar to that formed in said drill bit formed in he central portion of said insert, said pair of drive arm members alternatively fitting over the arm formed in said drill bit or said insert.

3. The device of claim 2 wherein the means for removably supporting the fixture on said insert comprises the arm formed in the central portion of the insert and a hook member removably supported on said insert arm to which the fixture is attached.

4. The device of claim 1 wherein the means for supporting the fixture on said insert comprises an arm formed in the central portion of the insert and a hook member removably supported on said arm, said fixture being attached to said arm.

5. The device of claim 1 wherein said fixture is a light.

6. A method for removably supporting a fixture on a backing member comprising the steps of:
    drilling a hole in a backing member with a drill connected to a drill bit;
    driving a cylindrical insert member having a threaded outer surface and having a diameter slightly greater than that of said hole into said hole with said drill connected to said drill bit to form a threaded surface on the surface of said hole such that the insert member threadably engages the surface of the hole, and
    removably supporting said fixture on the inner wall of said insert.

7. The method of claim 6 and further including providing a stop member on said insert member for limited the travel of said insert member into said hole.

8. The method of claim 6 wherein the fixture is supported on the inner wall of said insert by a hook attached at one end said inner wall and the other end to said fixture.

9. The method of claim 6 and further including the step of alternatively connecting said drill to said drill bit or to said insert member by means of a pair of similar approximately parallel arms on said drill bit, alternatively connecting said substantially parallel drive arms in slidable and non-rotatable engagement with said drill bit or said insert member for rotation therewith.

* * * * *